K. DIEHL.
PORTABLE SAWING MACHINE.
APPLICATION FILED MAY 6, 1914.
1,111,441.
Patented Sept. 22, 1914.
2 SHEETS—SHEET 2.
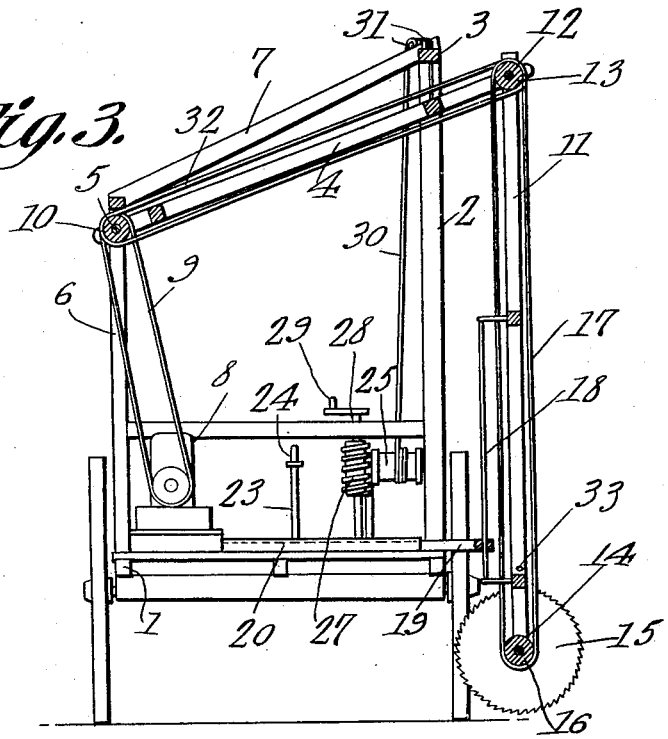
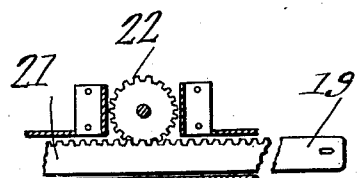

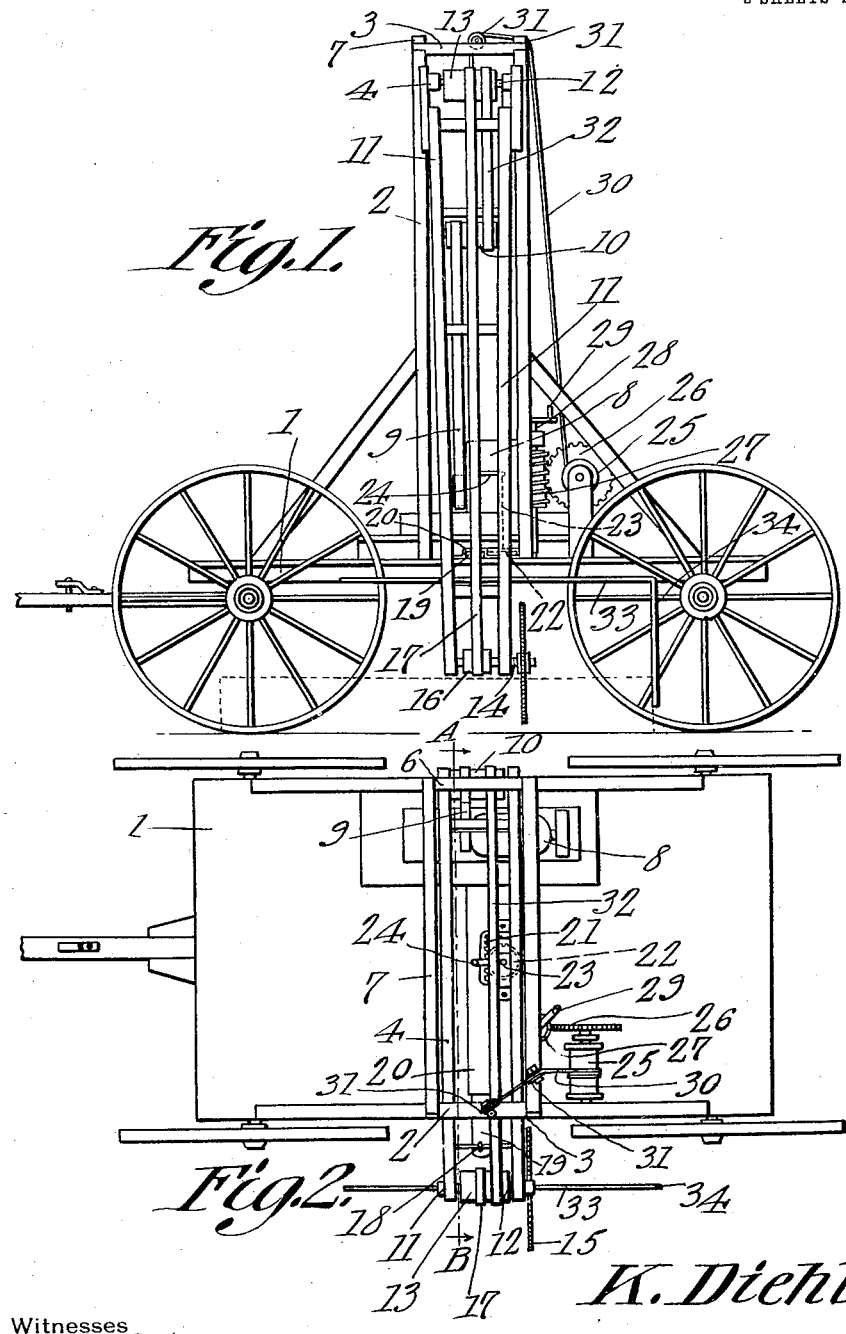

UNITED STATES PATENT OFFICE.

KARL DIEHL, OF ROCHESTER, NEW YORK.

PORTABLE SAWING-MACHINE.

1,111,441.   Specification of Letters Patent.   Patented Sept. 22, 1914.

Application filed May 6, 1914. Serial No. 836,749.

*To all whom it may concern:*

Be it known that I, KARL DIEHL, a citizen of the United States, residing at Rochester, in the county of Monroe and State of New York, have invented a new and useful Portable Sawing-Machine, of which the following is a specification.

This invention relates to portable sawing machines, one of its objects being to provide a machine of this character which can be moved readily from place to place and which utilizes a circular saw so supported as to be fed either laterally or upwardly and downwardly, thus to enable the operator to properly cut the logs adjacent to the machine.

A further object is to provide a machine of this character which is simple in construction and can be easily manipulated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the machine. Fig. 2 is a plan view thereof. Fig. 3 is a section on line A—B Fig. 2. Fig. 4 is a horizontal section showing a portion of the saw adjusting mechanism, said section being on an enlarged scale.

Referring to the figures by characters of reference 1 designates a wheel supported platform adapted to be drawn from place to place in any suitable manner and upstanding from one side of the platform are standards 2 connected at their upper ends, as shown at 3 and forming a guide in which an upper frame 4 is adapted to swing upwardly and downwardly, this upper frame being pivotally mounted on a shaft 5 journaled in standards 6 upstanding from the other side of the platform. The standards 6 are connected to the standards 2 by means of braces 7 so that a rigid structure is thus produced. A motor 8 is mounted on the platform and motion is transmitted therefrom through a belt 9 or the like to a pulley 10 mounted for rotation on the shaft 5.

A frame 11 is hung from the outer or free end of the frame 4, the same being pivotally connected thereto by a shaft 12 on which a pulley 13 is mounted to rotate. This hanging frame 11 is provided, at its lower end, with a shaft 14 to one end of which is secured a circular saw 15 while a pulley 16 is also secured to this shaft and receives motion through a belt 17 or the like from the pulley 13. A guide rod 18 is carried by the hanging frame 11 and extends parallel therewith, this rod being slidably mounted within an arm 19 which bears downwardly on the platform 1 and is slidably mounted within a transversely extending housing 20, that portion of the arm 19 within the housing being toothed to form a rack 21. A gear 22 meshes with this rack and is secured to the lower end of an upstanding shaft 23, this shaft being provided at its upper end with a crank arm 24 or the like whereby it can be rotated readily. Thus it will be seen that by rotating shaft 23 and gear 22 in one direction, the rack 21 will be slid outwardly, thus pushing against the rod 18 and causing frame 11 to swing outwardly whereas, when the rotation of the part 22 is reversed, the frame 11 will be swung inwardly.

A windlass 25 is supported above the platform and has a worm gear revoluble therewith, this gear being shown at 26. This gear is engaged by a worm 27 secured to a shaft 28 which is adapted to be rotated by means of a crank arm 29 or in any other suitable manner. A cable 30 is secured at one end to the windlass and extends over suitably disposed guide sheaves 31 and thence downwardly to the upper frame 4. Thus it will be seen that when the worm 27 is rotated in one direction, the cable 30 will be wound upon the windlass and frame 4 and all parts connected thereto will be elevated, whereas, when the rotation of the windlass is reversed, the frames 4 and 11 will be permitted to gravitate.

In using the machine, the same is moved to a position at one side of the log to be cut and after the motor has been started, the saw 15 is shifted downwardly and outwardly so as to properly engage the log and cut through it, it being understood that motion will be transmitted to the saw through the belt 9 to pulley 10 and thence through a belt 32 to the pulley 13 which, in turn, drives the belt 17 and pulley 16. By means of the crank 24, the saw 15 can be pushed laterally away from or toward the machine and by manipulating the worm 27, the circular saw can be raised or lowered.

If desired and as shown in Figs. 1 and 2, a gage may be used in connection with the frame 11 to enable the operator to cut the logs into uniform lengths. In the structure shown, this gage includes a rod 33 extended substantially horizontally through the frame 11 and having a depending arm 34 at its free end adapted to come against one end of the log being cut. This gage can be adjusted to bring the arm 34 any desired distance from the frame 11.

What is claimed is:—

A wood sawing machine, including a supporting and guiding structure, an upper frame mounted to swing upwardly and downwardly relative to said structure, a frame hung from and adapted to swing relative to the upper frame, and means for swinging the hanging frame laterally away from or toward the supporting structure, said means including a guide rod carried by the hanging frame, a slidable arm supported by the structure and slidably engaged by the rod, and means for shifting said arm relative to the supporting structure.

In testimony that I claim the foregoing as my own, I have hereto affixed my signature in the presence of two witnesses.

KARL DIEHL.

Witnesses:
 CARL W. SMITH,
 HENRY J. GERHARD.

Copies of this patent may be obtained for five cents each, by addressing the "Commissioner of Patents, Washington, D. C."